Patented Dec. 2, 1924.

1,517,292

UNITED STATES PATENT OFFICE.

ERNEST HENRY JONES, OF LONDON, ENGLAND.

ELECTRODE, WELDING ROD, AND SOLDERING STICK.

No Drawing.   Application filed October 12, 1920.   Serial No. 416,419.

*To all whom it may concern:*

Be it known that I, ERNEST HENRY JONES, a subject of the King of Great Britain, residing at 11 and 16 Church Street, Islington, London, England, have invented new and useful Improvements in Electrodes, Welding Rods, and Soldering Sticks, of which the following is a specification.

This invention relates to electrodes, welding rods and soldering sticks used for depositing and soldering metals by the electric arc or blow pipe, and particularly to those which are required to provide a certain amount of carbon in the deposited metal.

Electrodes, welding rods and soldering sticks (all hereinafter referred to as welding rods) have hitherto been provided with carbon of animal or vegetable origin either in the form of powder or paste, or with carbon impregnation by a case hardening process, or by providing an excess of carbon in one of the materials which form the welding rod or its covering.

According to this invention, the necessary proportion of carbon is added to the welding rod by the employment of graphite which, not being readily combustible like animal or vegetable carbon, alloys with the metal of the welding rod under the heat of the flame of the arc or blow pipe without burning to waste. It is well known that when employing animal or vegetable carbon a much larger quantity has to be used than might be considered necessary owing to a large proportion of the carbon being consumed without alloying with the metal.

Various forms of graphite may be used, according to the invention, such as the mineral graphite, retort graphite, or the manufactured graphite usually employed in the manufacture of carbon pencils for arc lamps and carbon blocks and plates. Experiments and practice have shown that retort graphite or manufactured graphite give more satisfactory results than mineral graphite although the latter is useful. The quantity of graphite required to provide the necessary proportion of carbon in the fused metal is small compared with animal or vegetable carbon, usually about a quarter the quantity, although it must be understood that it is almost impossible to determine the quantity of vegetable carbon that is required to give a desired amount of carbon in the deposited metal. The quantity of graphite would vary from 3 per cent for, say, nickel steel up to about 4 per cent for cast iron, and although the continued application of heat to deposited metal destroys vegetable carbon in proportion to the period, graphite is not affected in this way to any appreciable extent.

Graphite has a further advantage in that in powder form it is readily incorporated in a paste with or without other alloying materials and may form an ingredient of the slag forming covering of an electrode or of a paste or powder contained in a welding rod.

Either of the before mentioned graphites may be used singly or a mixture of two or more may be desirable in some cases.

I claim:—

1. Electrodes, welding rods and soldering sticks of the kind set forth, comprising a metal rod and a covering for the rod containing a substantial proportion of manufactured graphite.

2. Electrodes, welding rods and soldering sticks of the kind set forth, comprising a metal rod and a covering for the rod containing a substantial proportion of manufactured graphite in the form of retort graphite.

3. Electrodes, welding rods and soldering sticks of the kind set forth, comprising a metal rod and a covering for the rod containing a substantial proportion of powdered manufactured graphite.

In testimony whereof I have signed my name to this specification.

ERNEST HENRY JONES.